United States Patent [19]

Takahashi et al.

[11] Patent Number: 5,736,700
[45] Date of Patent: Apr. 7, 1998

[54] VEHICLE KNOB SWITCH APPARATUS

[75] Inventors: Atsuo Takahashi; Takuya Maeda, both of Miyagi-ken, Japan

[73] Assignee: Alps Electric Co., Ltd., Tokyo, Japan

[21] Appl. No.: 799,952

[22] Filed: Feb. 14, 1997

[30] Foreign Application Priority Data

Feb. 20, 1996 [JP] Japan .................. 8-032053

[51] Int. Cl.⁶ .................................................. H01H 3/16
[52] U.S. Cl. .................................... 200/61.54; 200/4
[58] Field of Search .............................. 200/4, 5 R, 11 R, 200/11 D, 11 DA, 17 R, 18, 61.27, 61.54, 332.2, 293.1

[56] References Cited

U.S. PATENT DOCUMENTS

| | | | |
|---|---|---|---|
| 3,603,748 | 9/1971 | Cryer | 200/5 B |
| 4,144,424 | 3/1979 | Takeda et al. | 200/61.88 |
| 4,376,237 | 3/1983 | Long | 200/61.27 |
| 4,640,997 | 2/1987 | Lane, Jr. | 200/61.54 |
| 4,849,585 | 7/1989 | Vidican et al. | 200/61.54 |
| 4,955,704 | 9/1990 | Janowicz | 350/637 |
| 5,003,132 | 3/1991 | Lagier | 200/4 |
| 5,453,588 | 9/1995 | DuRocher et al. | 200/61.54 |
| 5,581,058 | 12/1996 | Javery et al. | 200/4 |
| 5,665,948 | 9/1997 | Oikawa | 200/61.54 |

*Primary Examiner*—Michael L. Gellner
*Assistant Examiner*—Michael A. Friedhofer
*Attorney, Agent, or Firm*—Guy W. Shoup

[57] ABSTRACT

A vehicle knob switch apparatus including an operating lever, a cylindrical holder disposed at an end of the operating lever, a plurality of changeover switch portions accommodated in the interior of the holder, a first operating knob, mounted so as to be rotatable substantially coaxially with an axial line of the operating lever and not movable in the axial direction, for operating one of the plurality of changeover switch portions, and a second operating knob, swingably mounted to an end of the holder, for operating the other one of the plurality of changeover switch portions. The vehicle knob switch apparatus has an integrated switch mechanism, allows components to be installed in the vicinity of the steering column after confirmation of functions, and can be reduced in size.

4 Claims, 6 Drawing Sheets

VEHICLE KNOB SWITCH APPARATUS

BACKGROUND OF THE INVENTION

1. Field of the Invention

The present invention relates to a vehicle knob switch apparatus with a plurality of operating knobs mounted to an end of an operating lever.

2. Description of the Related Art

A knob switch apparatus is mounted in the vicinity of a vehicle steering column in order to control operation of a wiper, headlight, or the like, at a location near the handle. Such a vehicle knob switch apparatus may be provided with a pushbutton switch mechanism or a rotary switch mechanism. The pushbutton switch mechanism performs on/off operations and switches the operation state by operation of the pushbutton protruding toward the free end of the operating lever having one end supported in the vicinity of the steering column. A rotary switch mechanism performs on/off operations and switches the operation state by rotation of a part of the operating lever around the axial direction as center. These types of switches are used to perform on/off operations, wiper strength changeover operations, and intermittent operation changeover operations of the wiper apparatus, and to perform on/off operations of the headlight.

For example, Japanese Unexamined Utility Model Publication Nos. 3-95532 and 6-88033 disclose a vehicle knob switch apparatus in which the above-described two types of switch mechanisms are installed within the operating lever. The operating knob of one of the switch mechanisms is mounted to an end of the operating lever so as to be rotatable around the axial line of the lever. Rotation of the operating knob of this switch turns the headlight on and off. The pushbutton of the other switch is mounted to an of the lever. Pushing the pushbutton causes the window washer mechanism to be operated.

In such a vehicle knob switch apparatus, the operating knob is mounted to an end of the operating lever coaxially with the operating lever so as to be rotatable around the axial center of the operating lever (or fulcrum), with a fixed contact formed on the face of the operating lever which contacts the axial end face of the operating knob, and a movable contact formed on the axial end face of the operating knob. Switching operations are performed by rotating the operating knob. Accordingly, in the switch mechanism, a shaft, which rotatably supports the operating knob, is mounted to the axial center of the operating lever, and the pushbutton is supported at an end of the shaft so as to be pushable backward to allow switching operations to be performed.

However, in such a vehicle knob switch apparatus, only a pushbutton switch can be mounted in addition to the rotary switch due to the limited amount of space and the number of switching operations is limited. This is because the fixed contact and movable contact of the rotary switch are disposed side by side along the axial direction of the operating lever, thus increasing the longitudinal length of the switch apparatus, and because the operating knob of the operating switch is supported by a shaft raised with respect to the axial center of the operating lever. Therefore, the knob switch apparatus becomes large as a whole. In addition, the various components are installed unidirectionally to an extremely long shaft, thereby preventing easy installation of the various components, and allowing confirmation of functions only after mounting to the operating lever, which results in more frequent assembly errors.

SUMMARY OF THE INVENTION

Accordingly, a first object of the present invention is to provide a vehicle knob switch apparatus having an integrated switch mechanism, and facilitates installation of the lever members, which can be done after confirmation of functions.

A second object of the present invention is to provide a vehicle knob switch apparatus having a multi-changeover mechanism, without having to increase the longitudinal length of the knob switch apparatus.

A third object of the present invention is to provide a vehicle knob switch apparatus which makes it possible to mount a multi-changeover seesaw-shaped switch mechanism to the operating lever. In such a vehicle knob switch apparatus, a multi-changeover mechanism is provided, without having to increase the longitudinal length of the knob switch apparatus, and the operating knob is pivotally movably held by the supporter by simply engaging the recess and protrusion of the operating knob and the supporter. In such a case, the operational knob can be narrowed and take a larger variety of shapes. In addition, the gap between the holder and the keytop can be made smaller, thereby preventing entry of dust or the like, which results in fewer failures.

To achieve the first object, according to a first form of the present invention, there is provided a vehicle knob switch apparatus comprising an operating lever, a cylindrical holder disposed at an end of the operating lever, a plurality of changeover switch portions accommodated in the interior of the holder, a first operating knob, mounted to the holder so as to be rotatable substantially coaxially with an axial line of the operating lever and not movable in the axial direction, for operating one of the plurality of changeover switch portions, and a second operating knob, swingably mounted to an end of the holder, for operating the other one of the plurality of changeover switch portions.

To achieve the second object, according to a second form of the present invention, there is provided a vehicle knob switch apparatus comprising an operating lever, a cylindrical holder disposed at an end of the operating lever, an operating knob mounted to the holder so as to be rotatable substantially coaxially with an axial line of the operating lever and not movable in the axial direction, a substrate provided with a plurality of changeover switch portions on its surface and mounted in the interior of the holder such that its surface is substantially parallel to the axial line of the operating lever, a sliding driving type switch being one of the plurality of changeover switch portions and having a switch driving slide knob, and a cylindrical cam member mounted so as to be rotatable in synchronization with the operating knob and having a cam hole extending obliquely in the surface of the cam. In the vehicle knob switch apparatus, operation of the operating knob causes an edge of the cam hole of the cylindrical cam to allow driving of the slide knob of the sliding driving type switch.

To achieve the third object, according to a third object of the present invention, there is provided a vehicle knob switch apparatus comprising an operating lever, a cylindrical holder disposed at an end of the operating lever, a changeover switch portion accommodated in the interior of the holder, and an operating knob, swingably mounted to an end of the holder, for operating the changeover switch portion. In the vehicle knob switch apparatus the operating knob is provided with a protrusion or a recess as a swinging fulcrum of the knob and an engaging portion being a protrusion or an arcuate wall face positioned away from the protrusion or the recess. In addition, the holder is provided with a recess or protrusion, which engages the protrusion or the recess of the operating knob, and a guide portion being an arcuate wall face or protrusion for guiding the engaging portion. Further, the protrusion or the recess of the operating knob is pivotally supported by the recess or the protrusion of the holder, and the engaging portion of the operating knob is guided by means of the guide portion of the holder in order to swing the operating knob.

To achieve the third object, according to a fourth form of the present invention following the third form, there is provided vehicle knob switch apparatus, further comprising a click mechanism for stopping the operating knob at a predetermined angle.

According to the first form of the present invention, the knob switch apparatus has an integrated switch mechanism, and facilitates installation of the lever members, which can be done after confirmation of functions.

According to the second form of the present invention, the knob switch apparatus makes it possible to mount a multi-changeover switch mechanism, without having to increase the longitudinal length of the knob switch apparatus.

According to the third and fourth forms of the present invention, the knob switch apparatus makes it possible to mount a multi-changeover seesaw-shaped switch mechanism. In addition, the operating knob can be made narrower and take a larger variety of shapes, since it is pivotally movably held by the holder by simply engaging the recess and protrusion of the operating knob and the supporter. Further, the bearing center is located at the inner side of the knob, so that the rotational radius of the knob swing can be set at a minimum. Therefore, the holder and the keytop of the operating knob can be separated by a smaller distance, thereby preventing entry of dust or the like, which results in reduced failures. Consequently, it is possible to mount a multi-changeover seesaw-shaped switch mechanism to the operating lever.

DESCRIPTION OF THE PREFERRED EMBODIMENT

A description will now be given of a preferred embodiment of the vehicle knob switch apparatus of the present invention, with reference to the drawings.

Figure 1:
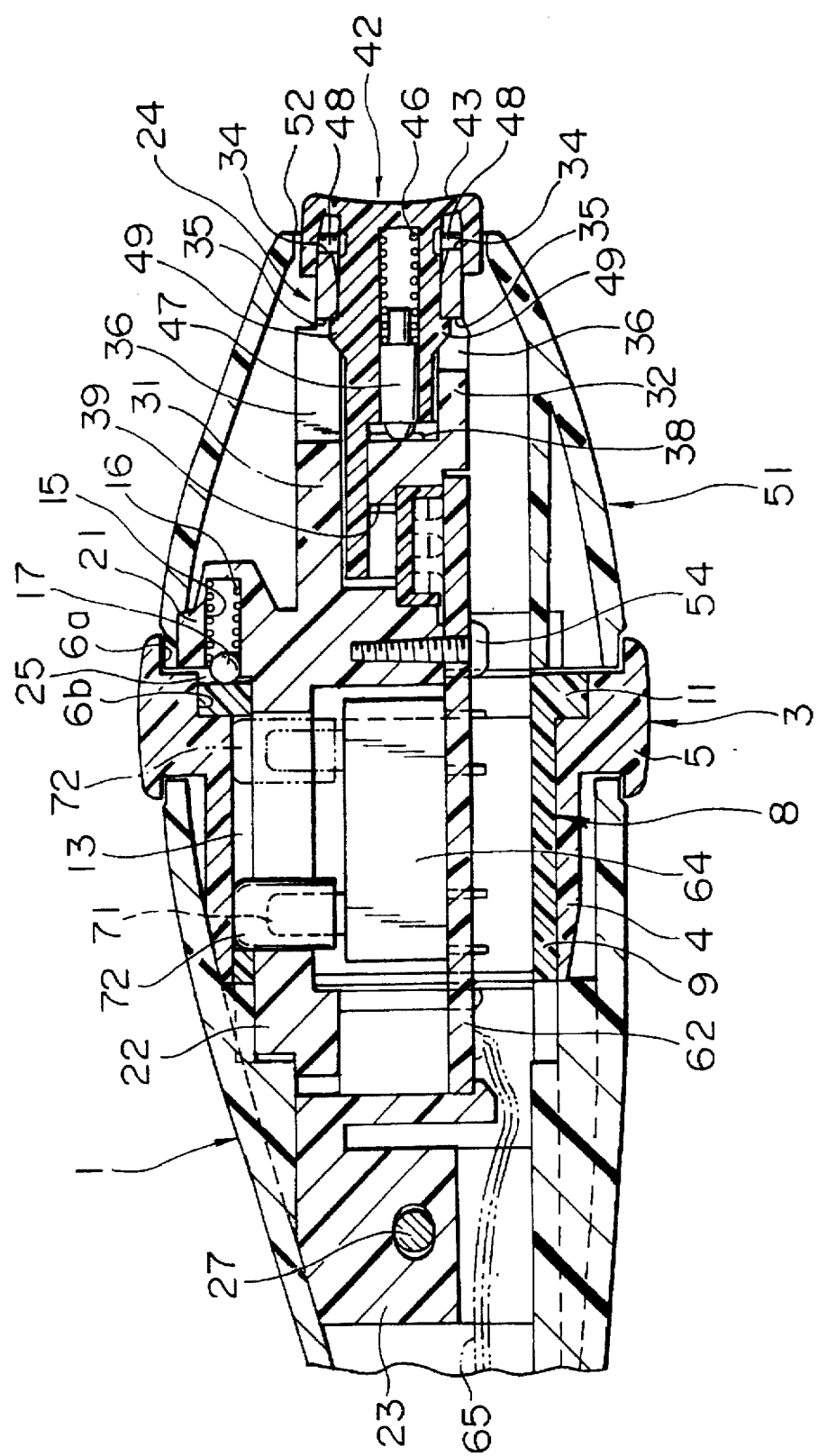
FIG. 1 is a longitudinal section of an embodiment of an end of a vehicle knob switch apparatus in accordance with the present invention.
Figure 2:
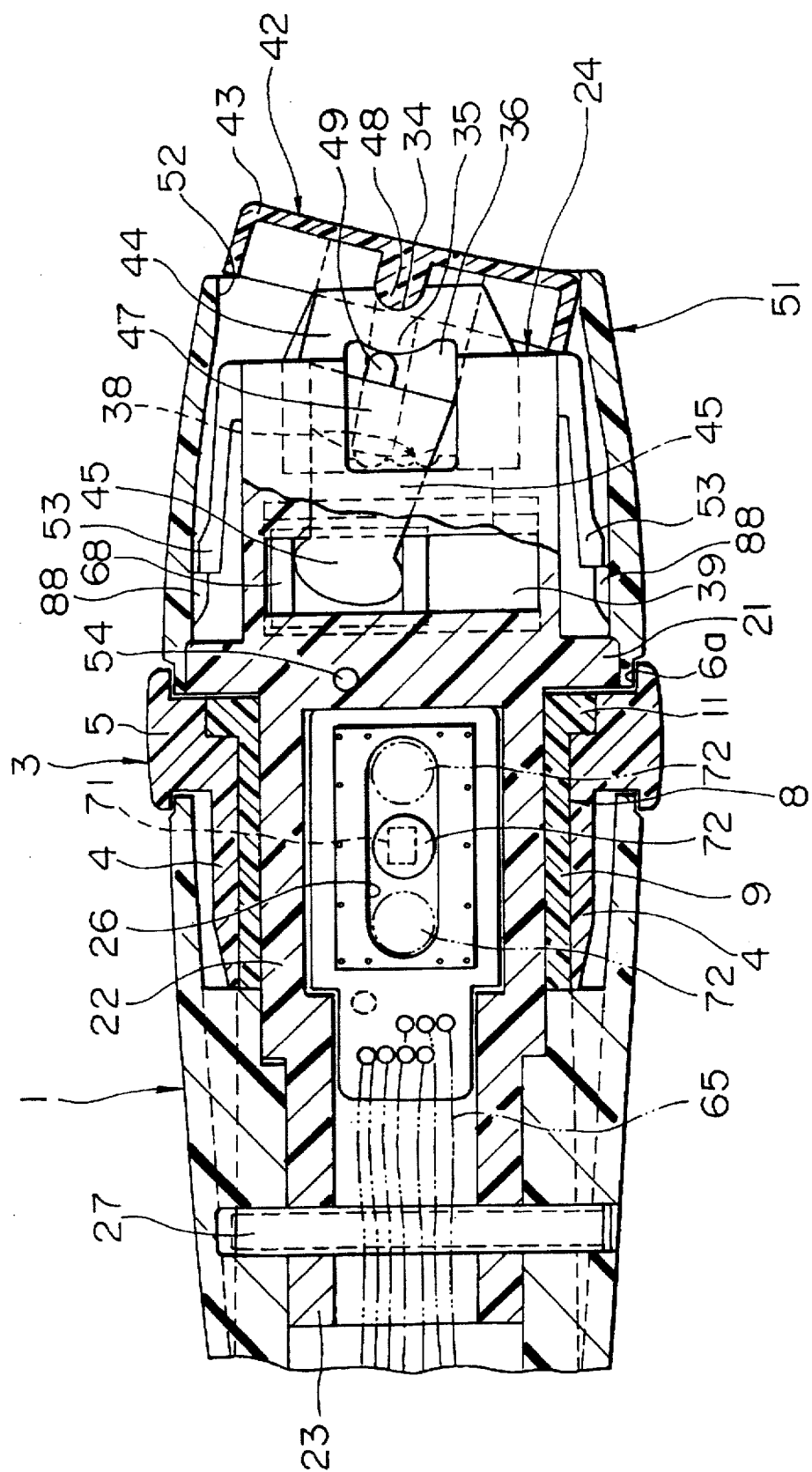
FIG. 2 is a transverse section of the vehicle knob switch apparatus.
Figure 3:
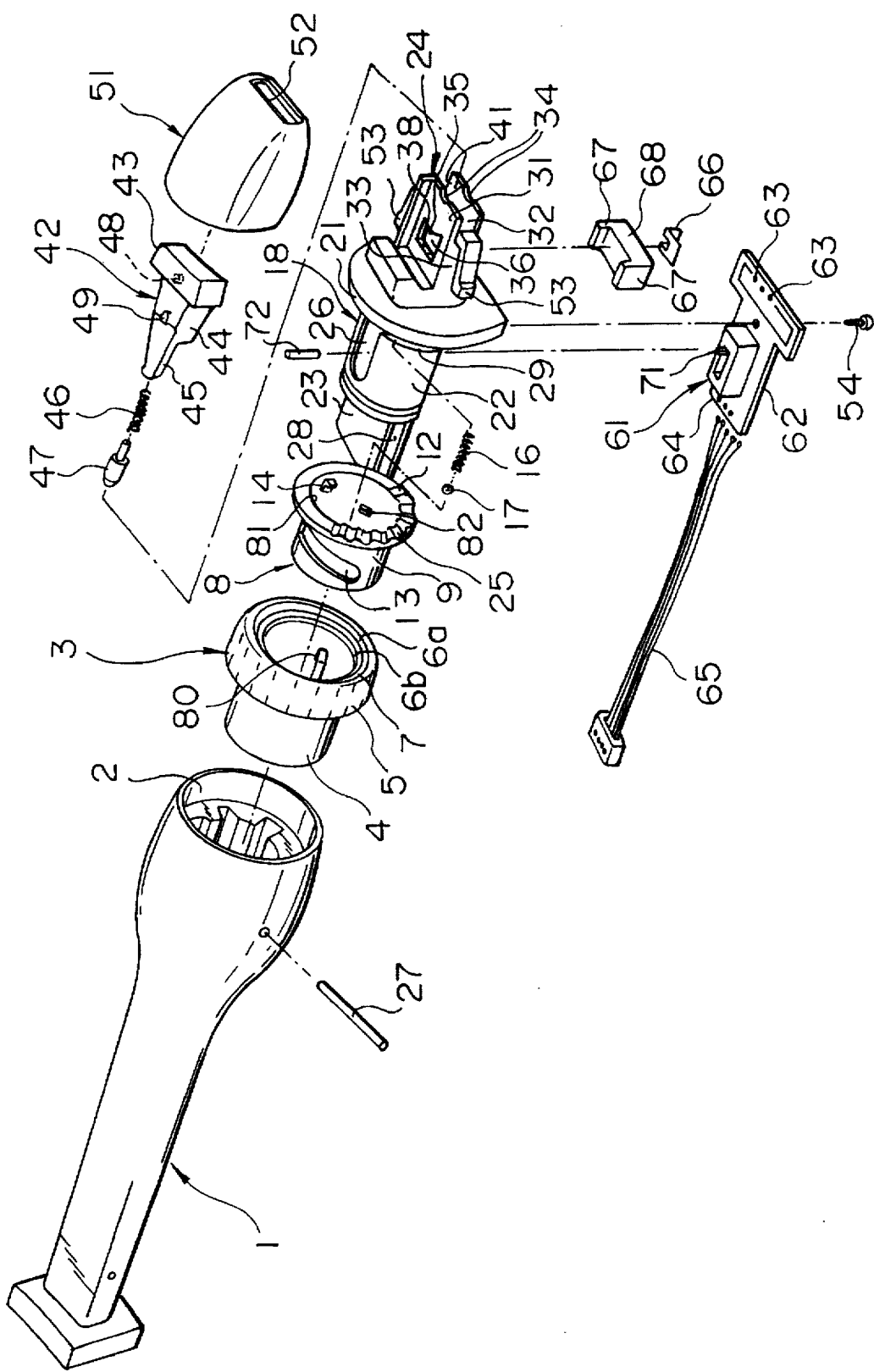
FIG. 3 is an exploded, perspective view of the vehicle knob switch apparatus.
Figure 4:
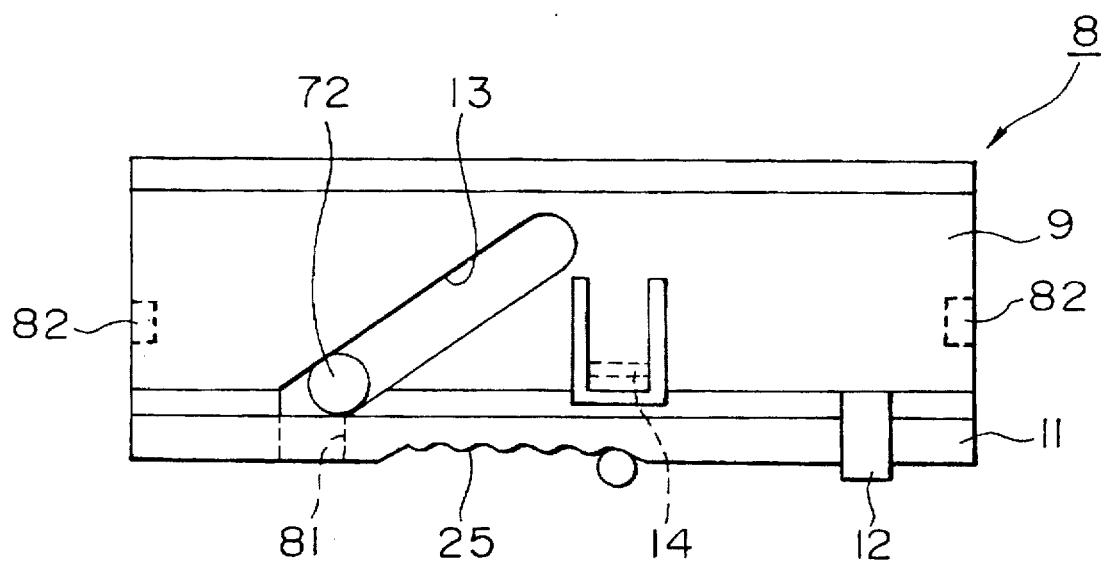
FIG. 4 is a view showing the outer peripheral face of the cylindrical cam member of the vehicle knob switch apparatus.
Figure 5:
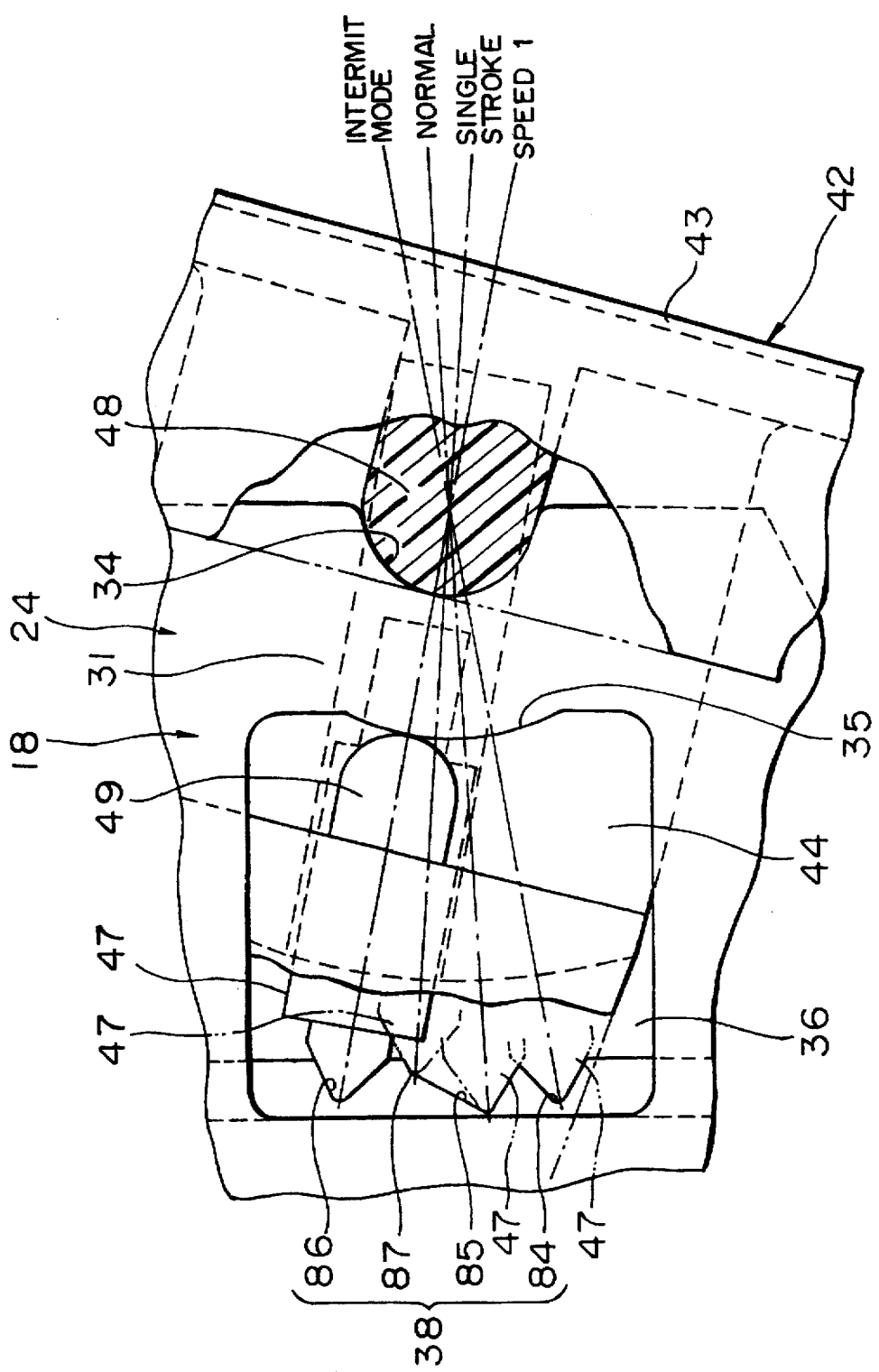
FIG. 5 is a view showing the operation state of the reverse button of the vehicle knob switch apparatus.
Figure 6:
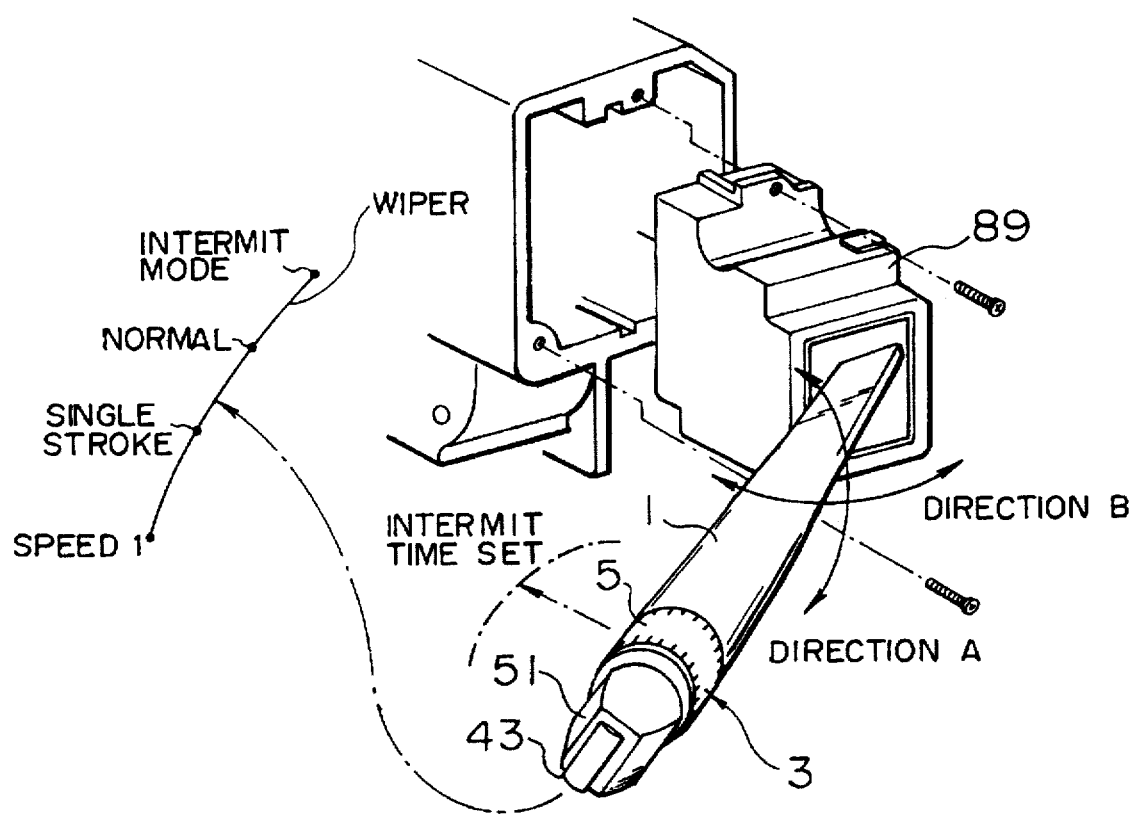
FIG. 6 is a perspective view of a wiper operating lever with the vehicle knob switch apparatus mounted thereto.

FIG. 1 is a longitudinal section of an embodiment of an end portion of the vehicle knob switch apparatus in accordance with the present invention. FIG. 2 is a traverse section of FIG. 1. FIG. 3 is an exploded, perspective view of the vehicle knob switch apparatus. FIG. 4 is a view showing the outer peripheral face of the cylindrical cam member. FIG. 5 is a view showing the operation state of the reverse button (second operation knob). FIG. 6 is a perspective view of a wiper operating lever with the vehicle knob switch apparatus mounted thereto.

The vehicle knob switch apparatus includes a cylindrical operating lever 1 whose base end (not shown) is mounted in the vicinity of a steering column (not shown). Hereunder, the steering column side is described as the base end, and the free end side of the operating lever 1 is described as the front end.

A cylindrical, rotary operating knob (first operating knob) 3 is fitted into an opening 2 at the front end of the operating lever 1 so as to be rotatable coaxially with the operating lever 1. The rotary operating knob 3 includes a cylindrical portion 4 fitted into the opening 2 of the operating lever 1, and a knob ring 5 integrally formed with the front end of cylindrical portion 4 and having an outer diameter which is slightly larger than the outside diameter of the opening 2 of tile operating lever 1. A first recessed step 6a and a second recessed step 6b are formed in the inner peripheral edge of the front end opening of the knob ring 5, with an engaging recessed groove 7 formed along the first and second recessed steps 6a and 6b. Reference numeral 80 denotes an elastic engaging pawl of the cylindrical portion 4 for locking it to a cylindrical cam member 8 (described later).

The cylindrical cam member 8 is fitted into an opening of the rotary operating knob 3 from the knob ring 5 side. The member 8 includes a cylindrical portion 9 whose axial length is shorter than that of the rotary operating knob 3, a collar 11 integrally formed with the front end of the cylindrical portion 9 and fitted into the recessed step 6b of the rotary operating knob 3, and an engaging protrusion 12 protruding from a portion of the collar 11 in the outer peripheral direction and fitted into the engaging recessed groove 7 of the rotary operating knob 3 to allow integral rotation of the cylindrical cam member 8 with the knob 3. As shown in FIG. 4, the cylindrical cam member 8 has a cam hole 13 and a path 81 for introducing a guide pin 72. The cam hole 13 extends obliquely along the cylindrical portion 9 from the collar 11 side to the base end side of the cylindrical portion 9, and allows a guide pin 72 (described later) to be driven. The path 81 extends from the front end side of the cam hole 13, along the inner face of the collar 11, and to the front end opening of the rotary operating knob 3.

The cylindrical cam member 8 has an engaging pawl 14 and an engaging hole 82. The engaging pawl 14 engages a holder 18 (described later), when the cylindrical cam member 8 is fitted to the holder 18, to prevent separation of the holder 18 from the cam member 8. The engaging hole 82 is in engagement with an engaging pawl 80 for locking the cam member 8 to the rotary operating knob 3.

A continuous wavy click portion 25, formed at the front end side face of the cylindrical cam member 8, comes into contact with a ball 17 (described later) in order for the operator to feel a click when the cylindrical cam member 8 and the rotary operating knob 3 integrally rotate with respect to each other.

The holder 18 is inserted into the front end side opening of the cylindrical cam member 8. The holder 18 includes a flange 21, a substantially semi-circular cylindrical portion 22, a flat contact portion 23, and a reverse button supporter 24. The flange 21, which is a disk-shaped member whose lower portion is cut substantially horizontally, is fitted to the first recessed step 6a of the rotary operating knob 3. The cylindrical portion 22 has one end axially mounted to the base end side face of the flange 21, an axial length which is longer than the axial length of the cylindrical cam member 8, and is inserted into the opening of the cylindrical cam member 8. The contact portion 23 extends from the side end of the base end of the cylindrical portion 22 such that an end of the contact portion 23 contacts the inner peripheral face of the operating lever 1. The reverse button supporter 24 is formed at the front end side face of the flange 21.

A small hole 15 is formed in the base end side face of the flange 21 to receive the metallic ball 17 which is constantly resiliently urged toward the front end by means of a coil spring 16. The ball 17, resiliently protruding from the small hole 15 of the flange 21, contacts and moves along the wavy click portion to allow the operator to feel a click as the rotary operating knob 3 rotates. A slot 26, formed in the upper surface of the cylindrical portion 22, extends in the axial direction, and a pin hole 28, formed in the contact portion 23, receives a spring pin 27 inserted from the side face of the operating lever 1. A retainer groove 29 is formed in the flange 21 side outer peripheral face of the cylindrical portion 22 in order to retain the engaging pawl 14 of the cylindrical cam member 8. The retaining groove 29 limits the range of rotation of the cylindrical cam member 8 and the rotary operating knob 3.

As shown in FIGS. 1 and 2, the reverse button supporter 24 includes a supporting plate 31 and a supporting plate 32 provided substantially vertically on the front end side face of the flange 21, with the supporting plate 32 being separated by a predetermined distance from the supporting plate 31. It also includes two side plates 33 which join the supporting plates 31 and 32 from both sides. Arcuate bearing recesses 34, 34 are formed, respectively, at about the center of the conical front end edges of the supporting plates 31 and 32. Arcuate engaging portions (guide portions) 35 are formed at the bearing 34 side of the openings 36 in relation to the rotational center of the reverse button (second operating knob) 42 as center. Openings 39 are formed in the base ends of the supporting plates 31 and 32 to accommodate a contact structure 68 (described later). Wavy click structures 38 are formed in the base end sides of the supporting plates 31 and 32 to stop the reverse button 42 (described later).

As shown in FIG. 5, the click structure 38 includes an intermit mode stopping portion 84 for stopping the reverse button 42 at the intermit position, a normal stopping portion 85 for stopping the reverse button 42 at the normal position, a speed 1 stopping portion 86 for stopping the reverse button 42 at the speed 1 position, and a single stroke stopping portion 87, which merges a slope obtained by forming one of the inclined surfaces of the normal stopping portion 85 into a more gentle slope, for holding the reverse button 42, when an operating force is exerted thereto, at a step near the crest of the wavy portion. The reverse button 42 at the single stroke stopping portion returns back to the normal stopping portion 85, when the button 42 is released. Moving the operating lever 1 to the single stroke position causes the wiper to be driven once.

The reverse button 42, corresponding to a seesaw pushbutton, is rotatably inserted and mounted into an opening 41 formed by the supporting plates 31 and 32 (of the reverse button supporter 24) and the two side plates 33, 33 joining the supporting plates 31 and 32. The reverse button (second operating knob) 42 includes a substantially rectangular keytop 43 which is long sideways, a substantially trapezoidal knob body 44 formed at the center and base end side of the keytop 43, and a flat contactor operating portion 45 extending from the base end side of the knob body 44.

A round hole is formed in the end of the knob body 44 at the base end side for receiving a coil spring 46 which constantly projects toward the base end side to resiliently contact the click structure 38. Key snap shafts (protrusions) 48, 48 protrude from both sides of the knob body 44 of the reverse button 42 and are pivotally supported on bearings 34, 34 as fulcra of the pivotal movement of the reverse button 42. Engaging protrusions (engaging portions) 49, 49 are formed on both base end side faces of the knob body 44 in order to engage the engaging arcuate portions 35 for mounting the reverse button 42 to the reverse button supporter 24.

A tapered, cylindrical case 51 covers the reversal button 42, which has an opening 52 to allow only the keytop 43 to protrude exteriorly. The base end side opening of the case 51 is loosely fitted to the first recessed step 6a of the rotary operating knob 3. Engaging steps 88, 88 are formed in the inner surface of the case 51. When the case 51 covers the reverse button supporter 24, the resilient engaging portions 53, 53 of the reverse button supporter 24 engage the engaging steps 88, 88 in the inner surface of the case 51 to prevent separation of the case 51 from the reverse button supporter 24.

In the above-described structure for supporting the reverse button 42 by the reverse button supporter 24, the same effects are obtained when the reverse button supporter 2 has an arcuate shaft (protrusion) instead of the arcuately cut bearing portion (recess), and the kep snap shaft (protrusion) 48 of the reverse button 42 has an arcuately cut bearing (recess). Similarly, the same effects are obtained when the engaging arcuate portion (guide portion) 35 of the reverse button supporter 24 is formed into the shape of the engaging protrusion (engaging portion) 49 of the reversal button 42 described above, and the engaging protrusion 49 of the reverse button 42 is formed into the shape of engaging arcuate portion 35 of the reverse button supporter 24 described above.

A switch body portion 61, which performs switching operations as a result of rotation of the rotary operating knob 3 and pivotal movement of the reverse button 42, includes a substrate fixed to the lower portion of the flange 21 by a screw 54, a plurality of contacts 63 spaced apart by predetermined distances on the substrate 62 and disposed below the reverse button supporter 24, and a sliding switch 64 placed on the substrate 62 and disposed below the cylindrical portion 22. The fixed contacts 63 and the sliding switch 64 input/output terminals are brought out exteriorly by a harness 65. A movable contact 66 is formed on the lower face of a contactor 68 so as to selectively contact any two of the fixed contacts from above the fixed contacts. The contactor 68 is slidably disposed above the substrate 62 so as to allow pivotal movement of the reverse button 42 whose contactor operating portion 45 is inserted between the two engaging protrusions 67 projecting from the upper surface of the contactor 68.

The sliding switch 64 is mounted on the contact substrate 62 so as to allow the slide knob 71, functioning as a movable contact, to move back and forth. A guide pin 72 is mounted to the slide knob 71, which protrudes from the slot 26 of the cylindrical portion 22 to within the cam hole 13 of the cylindrical cam member 8, whereby the slide knob 71 moves as the rotary operating knob 3 rotates.

A description will now be given of the assembly of the vehicle knob switch apparatus.

The reverse button 42 is inserted into the opening 41 of the reverse button supporter 24 of the holder 18 such that the two key snap shafts 48, 48 contact the bearings 34 of the reverse button supporters 24, allowing the engaging protrusions 49, 49 of the reverse button 42 to engage the openings 36, 36 of the reverse button supporters 24, respectively. As a result, the reverse button 42 will not separate from the holder 18 and is rotatably supported by the bearings 34.

Mounting the reverse button 42 allows a slide pin 47 of the reverse button 42 to be constantly pushed against the click structure 38 of the reverse button supporter 24 by the resilient force of the coil spring 46.

The contactor 68, having the movable contact 66 mounted on the lower surface thereof, is provided above the fixed contacts 63, and the substrate 62 with the sliding switch 64 fixed thereto at a predetermined location is mounted to the lower portion of the flange 21 by the screw 54. Here, the guide pin 72, mounted to the slide knob 71 of the sliding switch 64, is mounted so as to project from the slot 26 of the cylindrical portion 22 of the holder 18.

The upper portion of the contactor 68 is inserted from the opening 39 of the supporting plate 32, and the retainer protrusions 67, 67 of the contactor 68 are positioned so as to project within the opening 41 of the reverse button supporter 24. Therefore, the contactor operating portion 45 of the reverse button 42 is inserted between the retainer protrusions 67, 67, allowing the contactor 68 to move as a result of the rotation of the reverse button 42.

When the cylindrical cam member 8 is mounted to the holder 18, the cylindrical cam member 8 is fitted to the cylindrical portion 22, while the guide pin 72 projecting from the slot 26 of the cylindrical portion 22 is guided from the path 81 for introducing the cylindrical cam member 8 into the cam hole. The engaging pawl 14 engages the retainer 29 of the holder 18 to prevent separation of the cam member 8 from the holder 18.

Mounting the cam member 8 to the holder 18 allows the ball 17 to resiliently contact the click stopping portion 25 of the cylindrical cam member 8 by the coil spring 46.

The rotary operating knob 3 is then fitted to the cylindrical portion 9 of the cylindrical cam member 8, and the collar 11 of the cylindrical cam member 8 is fitted to the second recessed step 6b of the knob ring 5. The engaging pawl 80 for locking the rotary operating knob 3 engages the engaging hole 82 of the cylindrical cam member 82 to prevent separation of the knob 3 from the cam member 8. Here, the engaging protrusion 12 of the cylindrical cam member 8 is fitted to the engaging recess groove 7 of the rotary operating knob 3 to rotate the cylindrical cam member 8 along with the rotary operating knob 3.

The substrate 62 passes through the gap in the lower part of the cylindrical portion 9 of the cylindrical cam member 8, since the cylindrical portion 22 has a substantially semicircular shape, and the contact portion 23 has a flat shape.

After the reverse button 42 has been mounted to the reverse button supporter 24, and the cylindrical cam member 8 and the rotary operating knob 3 have been mounted to the cylindrical portion 22, as described above, the cylindrical portion 4 of the rotary operating knob 3 is inserted into the opening 2 of the operating lever 1, and the spring pin 27 is inserted into the pin hole 28 of the contact portion 23 from a side face of the operating lever 1. When the case 51 covers the reverse button 42 such that the keytop 43 projects out from the opening 52, the resilient engaging portions 53, 53 of the reverse button supporter 24 engages the engaging steps 88, 88 in the inner face of the case 51, and the base end side of the case 51 is fitted to the first recessed step 6a of the knob ring 5, thereby completing the assembly. Accordingly, the holder 18 is mounted to the front end of the operating lever 1, and the rotary operating knob 3 is rotatably exposed between the front end of the operating lever 1 and the case 51. The harness 65, connected to one end of the substrate 62, is inserted into the operating lever 1.

A description will now be given of the thus assembled vehicle knob switch apparatus in conjunction with the operation of a wiper apparatus.

In the operation of the operating lever 1 with the vehicle knob switch apparatus mounted thereto, the operating lever 1, having its base end mounted to a case 89, can swing in direction B and in direction A which is substantially perpendicular to direction B, as shown in FIG. 6. A click stopping mechanism not shown), such as the one described above, is provided in the case 89, and functions when the operating lever 1 swings in either of the directions A and B.

Operating the operating lever 1 in directions A and B turns on and off a plurality of switches provided in the case 8, whereby a plurality of devices are driven. This, however, is not related to the present invention, so that it will not hereunder be described.

A description will now be given of the operation of the reverse button 42 and the rotary operating knob 3.

A combination switch, in which the position of contact of the fixed contacts 63 and the movable contact 66 is adjusted by the reverse button, allows the wiper apparatus to be driven and selection of a mode from various modes, that is the single stroke mode, the speed 1 (fixed speed) mode, and the intermit (intermittent drive) mode. The rotary operating knob 3 allows setting of the operation time interval of the rear wiper set in the intermit mode.

When the reverse button 42 is stopped at the normal (off) position, the spindle pin 47 resiliently contacts the click structure 38. When the keytop 43 of the reverse button 42 stopped in the normal position is pushed from one end, the reverse button 42 rotates about the key snap shaft 48 as fulcrum. The slide pin 47, while compressing the coil spring 16, slides over the crest of the click structure 38 to stop at the speed 1 stopping portion 86. Releasing the keytop portion 43 causes the reverse button 42 to stay at the speed 1 stopping portion 86. Even when the reverse button 42 stopped at the portion 86 is released, it does not return to the neutral position or rock due to the returning force of the coil spring 16. As the reverse button 42 operates in the above-described way, the contactor 68 slides on the print substrate by means of the contactor operating portion 45, and the movable contact 66 of the contactor 68 moves from one of the fixed contacts 63 to contact another fixed contact 63, whereby the mode of the wiper apparatus is switched from the normal (off) mode to the speed 1 (fixed speed) mode.

In order for the wiper apparatus to operate intermittently, the reverse button 42 is moved to the intermittent mode position. For example, the reverse button 42 in the normal position, is operated to rotate about the key snap shaft 48, as fulcrum. The slide pin 47 slides over the crest of the click structure 38 to resiliently contact the intermit mode stopping portion 84 of the click structure 38. As the reverse button 42 moves rotationally, the contactor 68 slides on the substrate 62 by means of the contactor operating portion 45 to allow the movable contact 66 of the contactor 68 to move from one of the fixed contacts 63 to contact another fixed contact 63, whereby the mode of the wiper apparatus is switched from the normal (off) mode to the intermit mode.

When the intermit mode is selected, the wiper is driven intermittently at the intermittent time interval set by the rotary operating knob 3. The intermittent time interval of the wiper is changed by rotating the rotary operating knob 3 to thereby integrally rotate the cylindrical cam member 8 with the knob 3 in the same direction. The guide pin 72, protruding from the cam hole 13 of the cylindrical cam member 8, is moved by the rotation of the cylindrical cam member 8 toward the front end or base end directions depending on the direction of rotation of the cam member 8. Therefore, the slide knob 71 of the sliding switch 64, formed integrally with the guide pin 72, also moves, thereby allowing the intermittent time interval to be set. The rotation of the rotary operating knob 3 is set based on the distances between the irregularities of the click stopping portion 25, since the metallic ball 17 which is constantly resiliently biased toward the front end by the coil spring 16 is in contact with the click stopping portion 25. In addition, the rotation of the rotary operating knob 3 does not cause angular shifting of the set angle due to vibration.

A description will now be given of the operation at the single stroke position.

When the keytop 43 of the reverse button 42 in the normal position is pressed from one end, the reverse button 42 rotates about the key snap shaft 48 as fulcrum, causing the slide pin 47 to slide along the inclined face of the normal stopping portion 85 and contact the single stroke stopping portion 87 (being a corner near the crest) of the click structure 38. When the reverse button 42 is positioned at the single stroke stopping portion 87, the rear wiper is driven once. When the reverse button 42 is released, the returning force of the coil spring 16 causes the reverse button 42 to return to the neutral position. When the slide pin 47 is in contact with the single stroke stopping portion 87 and the reverse button 42 is further pressed with a large force, the slide pin 47 slides over the crest of the click structure 38 and arrives at the aforementioned speed 1 stopping portion 86.

The reverse button supporting 24, pivotally movably holding the reverse button 42, is formed simply by four flat members, the supporting plates 31 and 32 and the left and right side plates, so that the click structure 38 can at least extend over the full width of the supporting plate 32, thereby allowing a multi-changeover switch mechanism to be formed.

Although in the present embodiment, the vehicle knob switch apparatus has been used to operate a wiper apparatus, it may also be used to operate a front or rear wiper or any other device. Although the changeover switch portion took the form described above, a completed switch may also be mounted on the substrate.

In the present embodiment, the knob switch apparatus has an integrated switch mechanism, and facilitates installation of the lever members, which can be done after confirmation of functions. This is because the knob switch apparatus includes the operating lever 1, the holder 18 mounted to the front end of the operating lever 1, a rotatably mounted rotary operating knob 3, and a plurality of changeover switch portions including the changeover switch portion 64 operated by the rotary operating knob 3.

In addition, in the present embodiment, the knob switch apparatus can have a multi-changeover mechanism, without having to increase the longitudinal length of the knob switch apparatus. This is because the knob switch apparatus includes the operating lever 1, the holder 18 mounted to the front end side of the operating lever 1, a rotatably mounted rotary operating knob (first operating knob) 3, a plurality of switch portions, a substrate 62 mounted to the holder 18 so as to be substantially parallel to the axial line of the operating lever 1, the cylindrical cam member 8 with the obliquely formed cam hole 13, and the reverse button (second operating knob) 42 mounted to the front end of the holder 18.

Further, in the present embodiment, the knob switch apparatus can also have a multi-changeover mechanism, without having to increase its longitudinal length, by virtue of the following structure. The structure includes the operating lever 1, the holder 18 mounted to the front end of the operating lever 1, the rotatably mounted rotary operating knob (first operating knob) 3, the reverse button (second operating knob) 42 mounted to the front end of the rotary operating knob 3. The reverse button 42 includes the key snap shaft (protrusion) 48 as a swinging fulcrum of the button 42 and is pivotally supported in the recessed bearing 34 formed in the holder 18. The key snap shaft 48 may be a recessed portion, while the recessed bearing may be a protruding bearing. The engaging protrusion (engaging portion) 49 is formed on the swinging portion of the reverse button 42. The engaging arcuate portion (sliding portion) 35, which engages the engaging protrusion 49 and is slid, is formed in the holder 18 (integrally with the operating lever 1).

A better switching tactile feel is obtained, when the reverse button (second operating knob) 42 is further provided with the click structure 38 for stopping the reverse button 42 at a predetermined angle.

According to the first form of the present invention, the knob switch apparatus has an integrated switch mechanism, and facilitates installation of the lever members, which can be done after confirmation of functions.

According to the second form of the present invention, the knob switch apparatus can have a multi-changeover mechanism, without having to increase the longitudinal length of the knob switch apparatus.

According to the third form of the present invention, the knob switch apparatus make it possible to mount a multi-changeover switch mechanism, without having to increase its longitudinal length. In addition, the knob switch apparatus can be made narrower and take a wider variety of shapes, since the operating knob is pivotally movably held by the supporter by simply engaging the recess and protrusion of the operating knob and the supporter. Further, the knob switch apparatus can prevent entry of dust or the like and thus prevent switch failure, since the holder and the key top is separated by a smaller distance due to a minimum rotational radius. Therefore, it is possible to mount a multi-changeover seesaw-shaped switch mechanism to the operating lever.

What is claimed is:

1. A vehicle knob switch apparatus comprising:

an operating lever;

a cylindrical holder disposed at an end of said operating lever;

a plurality of changeover switch portions accommodated in an interior of said holder;

a first operating knob, mounted to said holder so as to be rotatable substantially coaxially with an axial line of said operating lever and not movable in an axial direction, for operating one of said plurality of changeover switch portions; and a second operating knob, swingably mounted to an end of said holder, for operating an other one of said plurality of changeover switch portions.

2. A vehicle knob switch apparatus comprising:

an operating lever;

a cylindrical holder disposed at an end of said operating lever;

an operating knob mounted to said holder so as to be rotatable substantially coaxially with an axial line of said operating lever and not movable in an axial direction;

a substrate provided with a plurality of changeover switch portions on its surface and mounted in an interior of said holder such that said surface is substantially parallel to the axial line of said operating lever;

a sliding driving type switch being one of said plurality of changeover switch portions and having a switch driving slide knob; and a cylindrical cam member mounted so as to be rotatable in synchronization with said operating knob and having a cam hole extending obliquely in a surface of said cam member, wherein operation of said operating knob causes an edge of the cam hole of said cylindrical cam member to allow driving of the slide knob of said sliding driving type switch.

3. A vehicle knob switch apparatus comprising:

an operating lever;

a cylindrical holder disposed at an end of said operating lever;

a changeover switch portion accommodated in an interior of said holder; and an operating knob, swingably mounted to an end of said holder, for operating said changeover switch portion, wherein said operating knob is provided with a protrusion or a recess as a swinging fulcrum of said knob and an engaging portion being a protrusion or an arcuate wall face positioned away from the protrusion or the recess of said operating knob, wherein said holder is provided with a recess or protrusion which engages the protrusion or the recess of said operating knob and a guide portion being an arcuate wall face or protrusion for guiding the engaging portion, and wherein the protrusion or the recess of said operating knob is pivotally supported by the recess or the protrusion of said holder, and the engaging portion of said operating knob is guided by means of said guide portion of said holder in order to swing said operating knob.

4. A vehicle knob switch apparatus according to claim 3, further comprising a click mechanism for stopping said operating knob at a predetermined angle.

* * * * *